June 26, 1962    W. WHARTON    3,041,009
AIRCRAFT
Filed Feb. 29, 1960    2 Sheets-Sheet 1
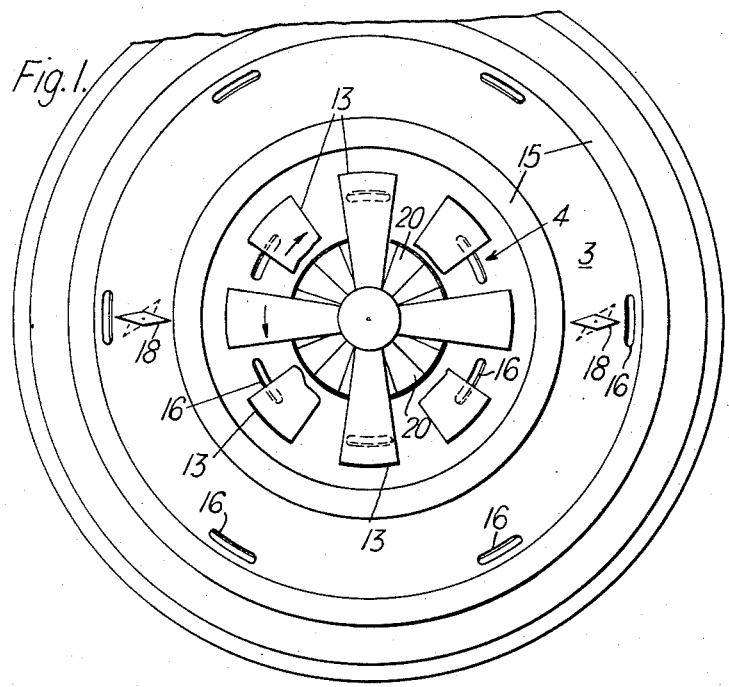
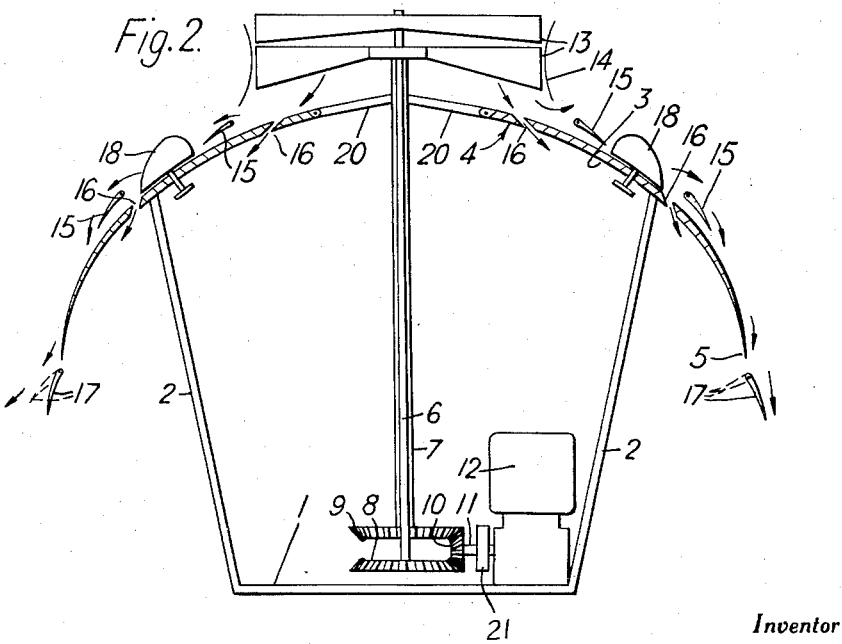
Inventor
WILLIAM WHARTON
By
Attorney Inventor
WILLIAM WHARTON
By
Attorney

United States Patent Office 3,041,009
Patented June 26, 1962

3,041,009
AIRCRAFT
William Wharton, Piccotts End House, Hemel
Hempstead, Hertfordshire, England
Filed Feb. 29, 1960, Ser. No. 11,932
Claims priority, application Great Britain Mar. 4, 1959
5 Claims. (Cl. 244—12)

This invention relates to aircraft and has for its object the provision of a simple type of aircraft capable of taking off and landing vertically, and to this end according to this invention there is provided an aircraft having a circular outwardly and downwardly curved ring aerofoil the centre portion of which, when the aircraft is at rest, is substantially horizontal while the outer edge portion thereof is substantially vertical, and means for causing air to be discharged down over the aerofoil whereby a lifting effect will be imparted to the aircraft.

The means for causing air to be discharged down over the aerofoil may comprise fan or blower means which is disposed above the aerofoil, the power therefor being derived from an internal combustion engine mounted in the aircraft.

In the case of engine driven fan means, it is preferred that the drive thereto should include a centrifugal clutch, and the blading thereof is arranged so that in the event of engine failure the fan means would be driven by the natural up-current of air with relation to the aircraft, the air thus supplied to and passed down over the aerofoil serving to effect a slow descent of the aircraft.

Contra rotating fan elements may be provided to eliminate or minimise the tendency of the aircraft to rotate bodily due to torque reaction. Moreover, for the same purpose, vertical vanes, which can be adjustable, may also be provided on the aerofoil.

Figure 3:
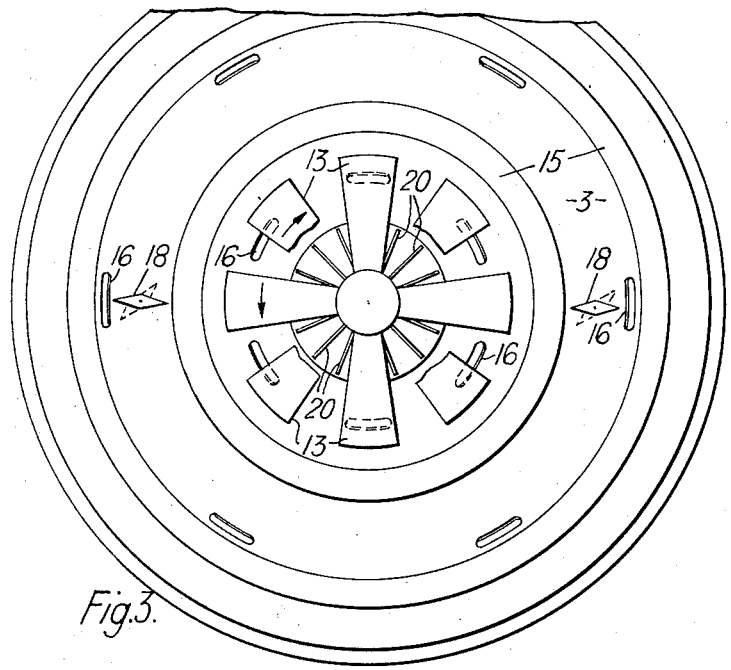
Figure 4:
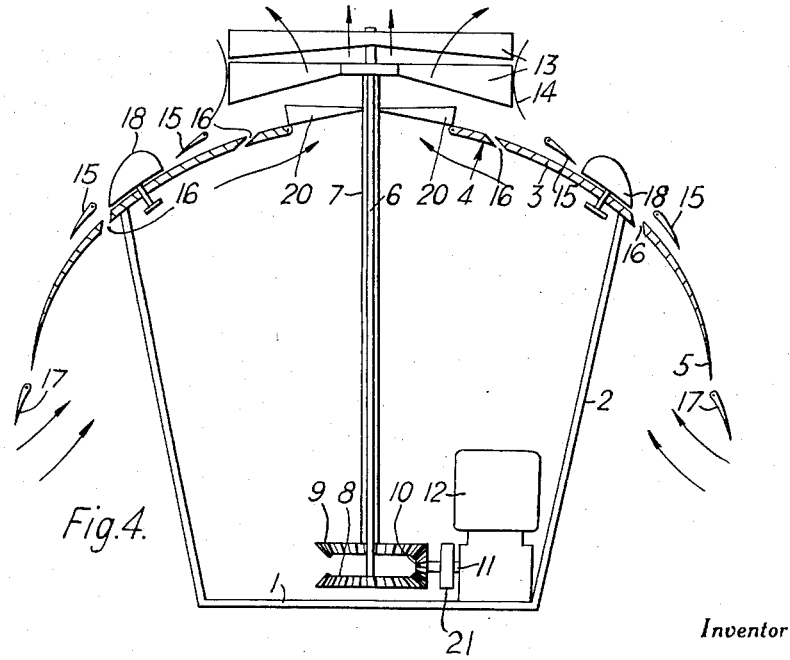

A simple form of aircraft in accordance with this invention is diagrammatically illustrated in the accompanying drawings, in which:

FIGURE 1 is a plan view and FIGURE 2 a central vertical section through the aircraft, while rising or hovering, and FIGURES 3 and 4 are similar views of the aircraft while descending.

The aircraft comprises a simple circular platform 1 with spaced circumferential support members or struts 2 which at their upper ends support a ring aerofoil 3. This aerofoil is a circular shape when viewed in plan, being, however, outwardly and downwardly curved from a substantially horizontal centre portion 4 to a substantially vertical edge portion 5.

Mounted vertically in and supported centrally of the aerofoil 3 is a shaft 6 and a tube 7, the two being concentric and freely rotatable with respect to each other and with respect to the aerofoil. At their lower ends the shaft 6 and tube 7 carry gear wheels 8 and 9 respectively, both of which mesh with a gear wheel 10 mounted on a shaft 11 which is adapted to be rotated by an internal combustion engine 12 secured to the platform 1. The shaft 6 and tube 7 will rotate in opposite directions, and each carries at its upper end fan blades 13 which are disposed within a cowling 14 and are adapted to direct air forcibly downwards over the aerofoil, the cowling 14 serving to prevent simple re-circulation of air in the region of the blades 13.

Mounted on top of the aerofoil 3 are concentric ring elements 15, each of aerofoil section. Formed in the aerofoil 3 there are rings of equally spaced apertures 16 which may have control flaps or the like, the object of these apertures being to provide a means of controlling air pressure under the aerofoil.

Mounted beneath the lower outer edge of the aerofoil is a ring of flaps 17 which are adjustable and may serve to direct air away from the aerofoil and to assist in general control.

Provided at two opposed points of the aerofoil are two adjustable control vanes 18 the function of which is to help minimise or eliminate any tendency of the whole aircraft to rotate due to torque reaction, such tendency being largely negatived by the contra rotating fan blades on the shaft 6 and tube 7.

It is pointed out that the accompanying drawings are diagrammatic and that the mounting of elements such as the ring elements 15, flaps 17, etc., would be effected through any suitable members or a skeleton frame.

In operation, air flowing down over the aerofoil imparts a strong lifting effect to the aircraft and it can be made to rise and hover.

A seat for a passenger (not shown) may be provided in any convenient position on the platform 1 and a compensating weight would be provided so as not to upset the overall balance of the aircraft.

Steering of the aircraft could be effected by adjusting the centre of gravity of the aircraft, that is, for example, by moving the engine, the compensating weight or the passenger in his heat. Steering could also be effected by the manipulation of the slots and flaps in the aerofoil.

In the centre of the aerofoil there is formed an aperture in which is mounted a ring of radial flaps 20. These flaps would normally remain closed under their own weight and would be further urged into closed position by the air from the fan blades 13.

It may happen, however, that the engine 12 may fail while the aircraft is in flight. The aircraft would immediately start to fall and then the upward rush of air would open the flaps 20 and keep the fan blades 13 rotating, the downward flow of air therefrom over the aerofoil serving to slow down the descent of the aircraft. In this connection it is pointed out again that in the drive from the engine 12 to the shaft 11 there is a centrifugal clutch 21 which disengages when the engine stops, thereby allowing the continued rotation of the fan blades.

I claim:

1. An aircraft comprising a passenger platform, spaced support members extending upwardly from the circumferential periphery of said platform, a ring aerofoil mounted on the upper ends of said support members, this aerofoil having a central opening therein and being circular when seen in plan and having a substantially horizontal centre portion and a substantially vertical edge portion, fan blades rotatably mounted above said ring aerofoil, a motor mounted on the platform and means for imparting drive from the motor to the fan blades so as to discharge air down over the ring aerofoil whereby a lifting effect will be imparted to the aircraft, such means including a clutch adapted on the failure of the motor to disengage to allow the fan blades to be rotated by the passage of air upwardly through the said central opening.

2. An aircraft comprising a passenger platform, spaced support members extending upwardly from the circumferential periphery of said platform, a ring aerofoil mounted on the upper ends of said support members, this aerofoil having a central opening therein and being circular when seen in plan and having a substantially horizontal centre portion and a substantially vertical edge portion, a pair of concentrically disposed drive elements mounted in and extending vertically and centrally through the ring aerofoil, fan blades mounted on said drive elements above the ring aerofoil, a motor mounted on the platform, and means for imparting drive from the motor to said drive elements and thus the fan blades thereon so as to cause discharge of air down over the ring aerofoil whereby a lifting effect will be imparted to the aircraft, such means including a clutch adapted on the failure of the motor to disengage to allow the fan blades to be rotated by the passage of air upwardly through the said central opening.

3. An aircraft as claimed in claim 2 wherein said drive means includes gearing by which the drive elements and fan blades carried thereby will be rotated in opposite directions.

4. An aircraft comprising a passenger platform, spaced support members extending upwardly from the circumferential periphery of said platform, a ring aerofoil mounted on the upper ends of said support members, this aerofoil having a central opening therein and being circular when seen in plan and having a substantially horizontal centre portion and a substantially vertical edge portion, a first drive element in the form of a tube disposed centrally of and extending vertically through the ring aerofoil, a second drive element in the form of a shaft arranged concentrically within the tube, said tube and shaft being freely rotatable with respect to each other and with respect to the aerofoil, fan blades mounted on said tube and shaft above the ring aerofoil, a motor mounted on the platform, and means for imparting drive in opposite directions from the motor to said tube and shaft and thus the fan blades thereon so as to cause discharge of air down over the ring aerofoil whereby a lifting effect will be imparted to the aircraft, such means including a clutch adapted on the failure of the motor to disengage to allow the fan blades to be rotated by the passage of air upwardly through the said central opening.

5. An aircraft comprising a passenger platform, spaced support members extending upwardly from the circumferential periphery of said platform, a ring aerofoil mounted on the upper ends of said support members, this aerofoil having a central opening therein and being circular when seen in plan and having a substantially horizontal center portion and a substantially vertical edge portion, fan blades rotatably mounted above said ring aerofoil, a motor mounted on the platform, means for imparting drive from the motor to the fan blades so as to discharge air down over the ring aerofoil whereby a lifting effect will be imparted to the aircraft, such means including a clutch adapted on the failure of the motor to disengage to allow the fan blades to be rotated by the passage of air upwardly through the said central opening, and a plurality of flap elements mounted in said central opening and adapted to close same when the fan blades are being rotated by the motor, but to open on the failure of the motor to allow the upward passage of air.

References Cited in the file of this patent

UNITED STATES PATENTS

| 1,361,222 | Berliner | Dec. 7, 1920 |
| 2,014,051 | Nishi | Sept. 10, 1935 |
| 2,340,427 | Putt | Feb. 1, 1944 |
| 2,547,266 | Hoglin | Apr. 3, 1951 |
| 2,695,674 | Kaman | Nov. 30, 1954 |
| 2,978,206 | Johnson | Apr. 4, 1961 |

FOREIGN PATENTS

| 15,735 | Great Britain | of 1912 |